Feb. 27, 1923.
W. EMARY
TIRE CHAIN TIGHTENER
Filed Apr. 13, 1922
1,446,791
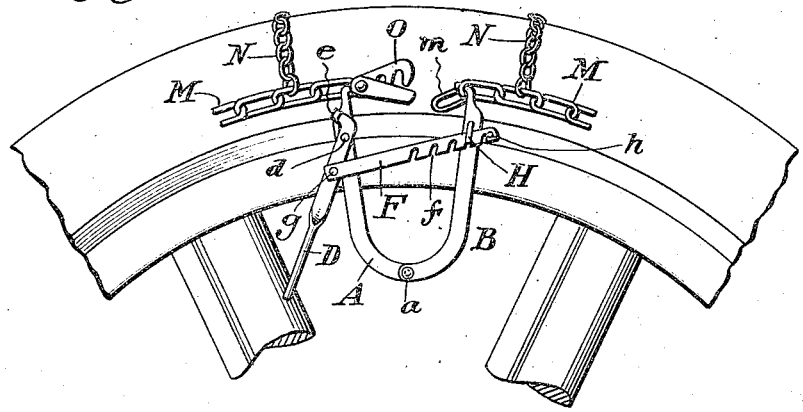
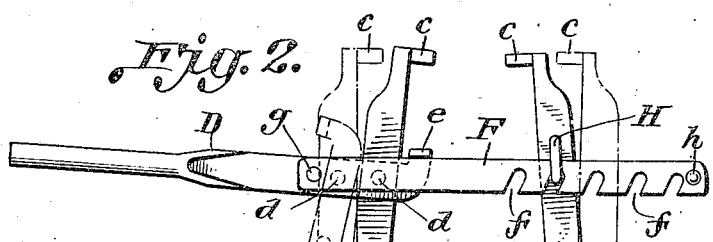
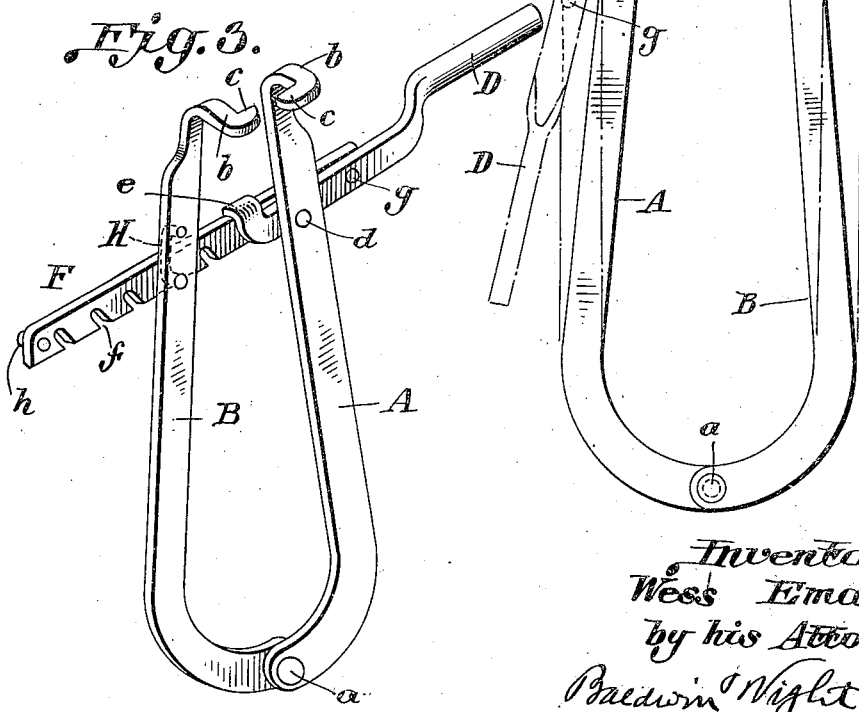
Inventor
Wess Emary
by his Attorneys
Baldwin & Wight Patented Feb. 27, 1923.

1,446,791

UNITED STATES PATENT OFFICE.

WESS EMARY, OF OSCEOLA, IOWA.

TIRE-CHAIN TIGHTENER.

Application filed April 13, 1922. Serial No. 552,156.

*To all whom it may concern:*

Be it known that I, WESS EMARY, a citizen of the United States, residing at Osceola, in the county of Clarke and State of Iowa, have invented certain new and useful Improvements in Tire-Chain Tighteners, of which the following is a specification.

This invention relates to tools for drawing together the ends of skid chains commonly used on automobile wheels. These chains are quite heavy, and when applied to a wheel, are commonly held in place by detachable fastening devices. It is often difficult to so apply the chains that the ends thereof can be drawn so closely together that the fastening devices may be attached and locked, and various tools have heretofore been used for drawing the chains together in order that the fastening devices may be applied. Some of these tools have only a short range of movement and cannot operate when the ends of the chains are far apart while others do not afford sufficient power to properly tighten the chains.

According to my invention I provide a tool which may be adjusted to operate on chains of various sizes of lengths and which when applied and operated exert such force as to overcome any resistance encountered which tends to prevent the bringing together of the ends of the chain.

In carrying out my invention I employ two jaws which are pivotally connected with each other and are provided with hooks adapted to engage the chain links at the opposite ends of the chain. An operating lever is pivotally connected, near its innner end, with one of the jaws, and said lever is also pivotally connected with a link which extends to the companion jaw of the pair and is adjustably connected therewith, the arrangement being such that the jaws may be spread to any desired extent and the link may then be connected with the companion jaw in such manner that when the lever is operated the hooked ends of the chain are made to approach each other thus bringing the ends of the chain close together so that the fastening devices may be secured and the chain tightly held.

In the accompanying drawings:—

Figure 1 shows in elevation a portion of an automobile wheel with a tire chain thereon and with my improved chain tightener applied to the ends of the chain.

Figures 2 and 3 are on an enlarged scale.

Figure 2 is an elevation of the tool showing how the parts are connected, illustrating in dotted lines the position of the parts before the operating lever is actuated to tighten the chain, and showing in full lines the position of the parts when the lever has been moved to its full extent.

Figure 3 is a perspective view of the tool with the chains in the position they assume when the lever has been operated.

My improved chain tightener comprises two jaws A and B, hinged together at $a$, and together forming a substantially U-shaped tool. Each of these chains is formed at its outer end with an arm $b$ having a tooth $c$. In this way each jaw member is provided with a hooked end.

An operating lever D is pivotally connected with the jaw A at $d$. The shorter arm of this lever is formed with a stop lug $e$ for a purpose hereinafter described. A link F, formed with a series of notches $f$, is pivotally connected with the lever D at $g$ and it extends through a hoop H on the jaw B and may move lengthwise therein, its inner movement being limited by a stop stud $h$.

M indicates a longitudinal chain and N indicates cross chains. O indicates a fastening device of well known form. When the ends of the chain are brought together the device O is engaged with the chain and holds it tightly in place.

Figure 1 shows how the chain tightener is applied to the opposite ends of the longitudinal chain before the chain is tightened on the wheel. The link F is made to engage the loop H, as shown before any force has been applied to the tightener, a suitable notch $f$ being selected for this purpose. If the ends of the chain are far apart a notch near the outer end of the link is selected; if the ends of the chain are relatively close together, a notch $f$ nearer the lever D is employed. When the hooked ends of the chain are engaged with the chain in the manner indicated the lever D is raised. This causes the link F to pull the jaw B over towards the jaw A until the link $m$ is within the range of the fastening device O which may be then applied. As soon as the fastening device is thus applied, the lever D may be lowered and the tool withdrawn.

A tool thus constructed may be operated with sufficient power to tighten a chain of large dimensions or of great weight even where there is great resistance to the movement of the chain on the wheel, and the tool is readily adjustable to accommodate itself to different conditions of the chain whether the ends thereof are close together or far apart.

It will be observed by reference to Figure 2 that when the lever D is raised to its full extent its inner end carrying the stop lug *e* passes beyond the dead center position and the parts are locked.

I claim as my invention:—

1. A chain tightener comprising two jaws pivotally connected with each other and having hooked outer ends, a lever pivotally connected with one of the jaws, and a link pivotally connected with the lever and adjustably connected with one of the jaws.

2. A chain tightener comprising two jaws pivotally connected with each other, a lever pivotally connected with one of the jaws and having a stop lug on its inner end, a link with which the stop lug is adapted to engage and which is pivotally connected with the lever, and means for adjustably connecting said link with the other jaw of the tightener.

3. A chain tightener comprising two jaws pivotally connected and one of which is provided with a loop, a lever pivotally connected to the other jaw, and a link formed with a series of notches pivotally connected with the lever and extending through the loop.

In testimony whereof, I have hereunto subscribed my name.

WESS EMARY.